United States Patent [19]

Curtis

[11] Patent Number: 5,505,101
[45] Date of Patent: Apr. 9, 1996

[54] GEARBOX

[75] Inventor: Lloyd S. Curtis, R.R. #2 Box 291, Dodge City, Kans. 67801

[73] Assignee: Lloyd S. Curtis, Dodge City, Kans.

[21] Appl. No.: 121,334

[22] Filed: Sep. 14, 1993

Related U.S. Application Data

[63] Continuation-in-part of Ser. No. 11,624, Aug. 10, 1993, Pat. No. Des. 356,094.

[51] Int. Cl.$^6$ .............................. F16H 57/02; F16H 57/04
[52] U.S. Cl. ................................... 74/417; 74/606 R
[58] Field of Search .................... 74/417, 606 R

[56] References Cited

U.S. PATENT DOCUMENTS

| 2,604,795 | 6/1952 | Ristow | 74/417 |
| 2,620,840 | 12/1952 | Schafer | 74/417 |
| 2,697,362 | 12/1954 | Keesling | 74/417 |
| 3,256,746 | 6/1966 | Smith | 74/417 |
| 3,955,429 | 5/1976 | Holden | 74/606 R X |
| 4,604,327 | 8/1986 | de Smet | 74/606 R X |
| 4,719,813 | 1/1988 | Chalik | 74/417 X |
| 5,207,121 | 5/1993 | Bien | 74/606 R |

OTHER PUBLICATIONS

Juvinall, R. C. and Marshek, K. M. Fundamentals of Machine Component Design, N.Y., J. Wiley & Sons, 1991, pp. 663–TJ320, 1988.

Avallone, E. A., Ed. Marks' Standard Handbook for Mechanical Engineers, N.Y., McGraw–Hill, 9th ed., 1987, pp. 6–92, 94; 8–123.

Primary Examiner—Charles A. Marmor
Assistant Examiner—Nathan O. Jensen
Attorney, Agent, or Firm—Hill, Steadman & Simpson

[57] ABSTRACT

The present invention relates to an improved gearbox having both a symmetrical housing and straddle-mounted bearings, to provide a gearbox which is both versatile and moderate in cost.

8 Claims, 3 Drawing Sheets

GEARBOX

BACKGROUND OF THE INVENTION

This is a continuation-in-part of a previously filed design application entitled "An Improved Gearbox", Ser. No. 2/011,624, filed on Aug. 10, 1993, now design U.S. Pat. No. 356,094.

The present invention relates to gearboxes in general, and more particularly to an improved gearbox having both a symmetrical housing and straddle-mounted bearings to provide a gearbox which is both versatile and moderate in cost.

In the prior art, certain gearbox designs existed which included a relatively expensive housing and/or a housing which required a variety of different internal mount mechanisms for righthand drive and/or lefthand drive, whether clockwise or counter-clockwise.

Other gearbox designs of the prior art required several different mounting mechanisms for the bearings depending upon whether the output shafts were disposed to the left or to the right, or both.

In addition, certain of the prior art gearboxes required an extended hub for the input shaft, principally because the output shaft was journaled on bearings held by and disposed near the exterior of the gearbox housing. This larger gearbox was less convenient to use in certain applications.

Additional examples of prior art gearboxes have utilized bearings which were made of metal, and although functioning adequately and with good bearing life, such bearings were of a relatively large cost for the functioning they provided.

In view of the defects, deficiencies and detriments of such prior art gearbox designs, it is a principal object of the gearbox of the present invention to materially overcome these defects, deficiencies and detriments.

More particularly, it is an important object of the improved gearbox of the present invention to provide a symmetrical housing which is greater in versatility than prior art asymmetrical gearboxes.

It is a further object of the improved gearbox of the present invention to provide a gearbox having both a symmetrical housing and bearings which are straddle-mounted to reduce the overall size of the gearbox housing.

It is also a further object of the improved gearbox of the present invention to provide an improved gearbox having a common bearing mount which includes bearing mount means for journaling each of the shafts required for any given gearbox design.

It is a yet further object of the improved gearbox of the present invention to incorporate bearings formed of a plastics and/or composite material for retention of strength and bearing life while reducing cost.

These and other objects of the improved gearbox of the present invention will become apparent to those of ordinary skill in the art upon reviewing the following summary of the invention, brief description of the drawing, detailed description of preferred embodiments, appended drawings and the claims hereof.

SUMMARY OF THE INVENTION

The improved gearbox of the present invention includes a symmetrical, split-half housing, which may be preferably formed of die-cast aluminum, or other metal. Such housing has top and bottom portions with input and output shaft openings therein. The input and output shafts are disposed therethrough. The housing has a horizontal plane of symmetry such that the top and bottom portions are essentially interchangeable. The housing also has a transverse plane of symmetry taken longitudinally along and through at least one of the input and/or output shafts.

A common bearing mount is disposed within the housing and holds the bearings thereon for journaling the input and output shafts. Such bearings are held on the common bearing mount and are preferably formed in preferred embodiments of a plastics and/or composite material.

BRIEF DESCRIPTION OF THE DRAWING

The improved gearbox of the present invention is set forth in the following drawing, and in which.

DETAILED DESCRIPTION OF THE INVENTION

Figure 1:
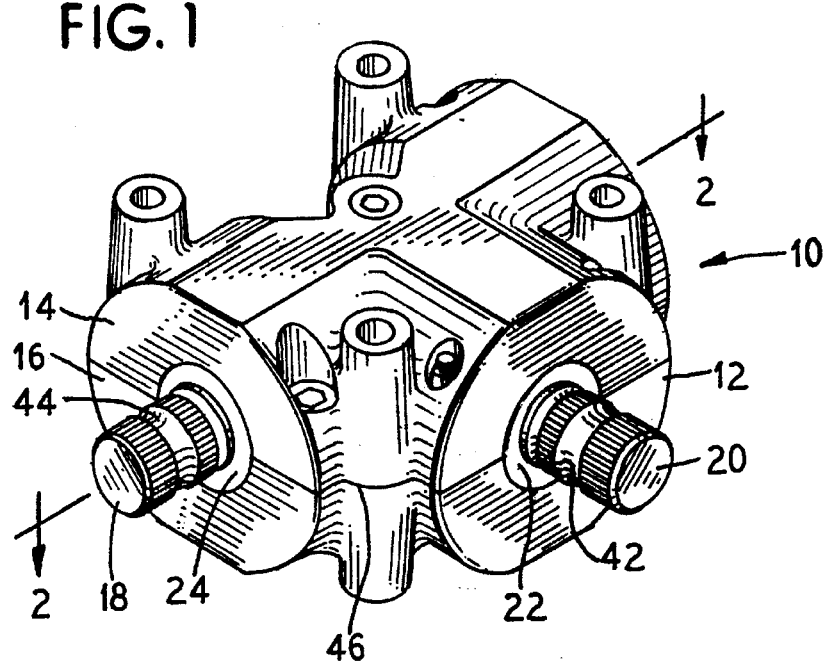
FIG. 1 is a perspective view of the improved gearbox of the present invention showing the essentially identical top and bottom housing portions, and representative input and output shafts, although other shaft arrangements may be utilized.
Figure 2:
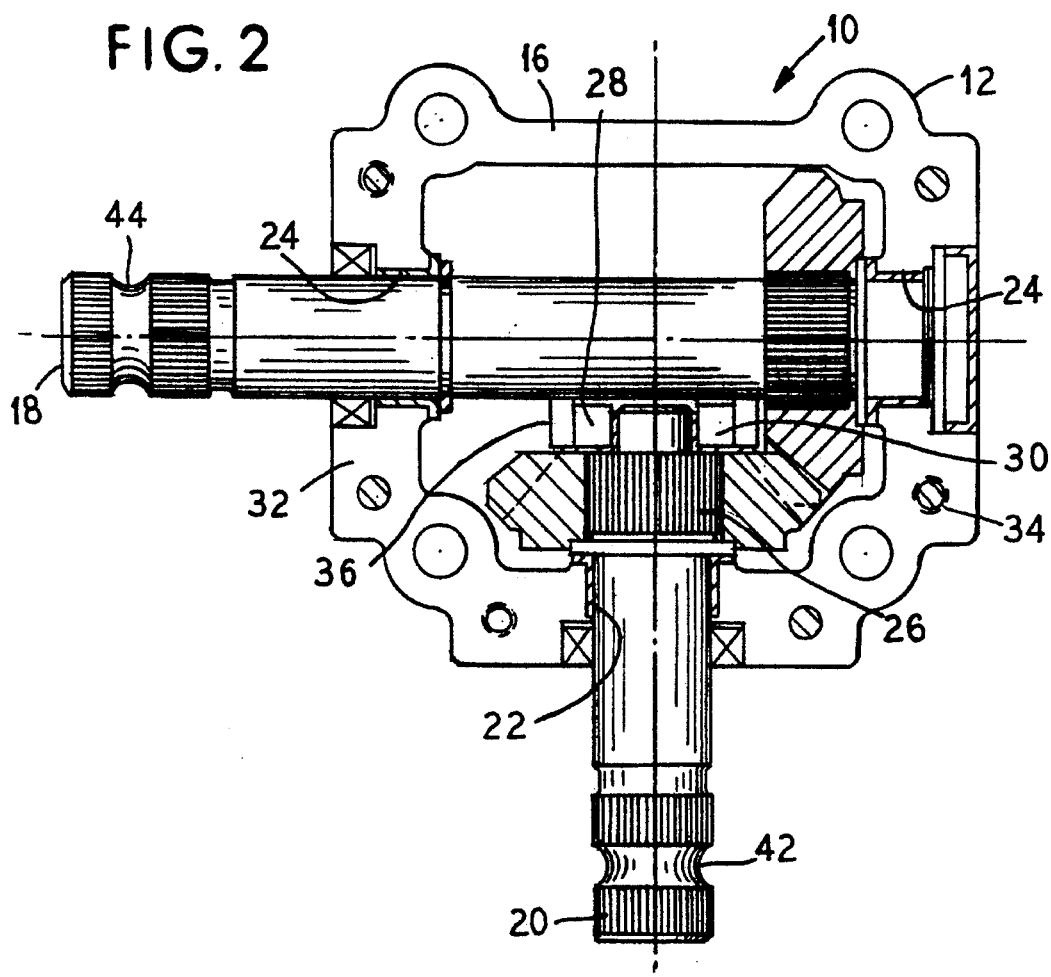
FIG. 2 is a cross sectional view of one preferred embodiment of the improved gearbox of the present invention taken along lines 2—2 of FIG. 1 and showing the details of the internally journaled input and output shafts on bearings held by a central bearing mount means wherein only one of the input or output shafts is journaled at the central bearing mount, and the other such shaft is journaled on opposite sides of the housing.

Referring now to the drawing, wherein the improved gearbox of the present invention generally is set forth in the embodiment of FIGS. 1 and 2 hereof, gearbox 10 comprises a symmetrical split-half housing 12, such housing having top 14 and bottom 16 portions thereof. In the alternative preferred embodiment of FIG. 3, common elements are designated by adding 100 to the corresponding designation set forth in FIGS. 1 and 2. In the prior art structure of FIG. 4, the number 200 is added to any comparable element, although the arrangement hereof is different in many respects from that of the inventive structure of FIGS. 1, 2 and 3.

Housing 12 has a horizontal plane of symmetry such that top portion 14 and bottom portion 16 are essentially identical, and thus may be interchanged, such as for example when such gearbox 10 is turned upside down. Of course, such gearbox 10 is turned upside down, for example a leftwardly disposed output shaft 18 as shown in FIGS. 1 and 2 then becomes a rightwardly output shaft, which location is shown for example in FIG. 3 at rightwardly disposed output shaft 118, while the location of input shaft 20 remains unchanged. Such alternative disposition of left to right, and visa-versa, is considered to be a considerable advantage in terms of versatility, such that fewer gearboxes need to be stocked for different uses.

Figure 5:
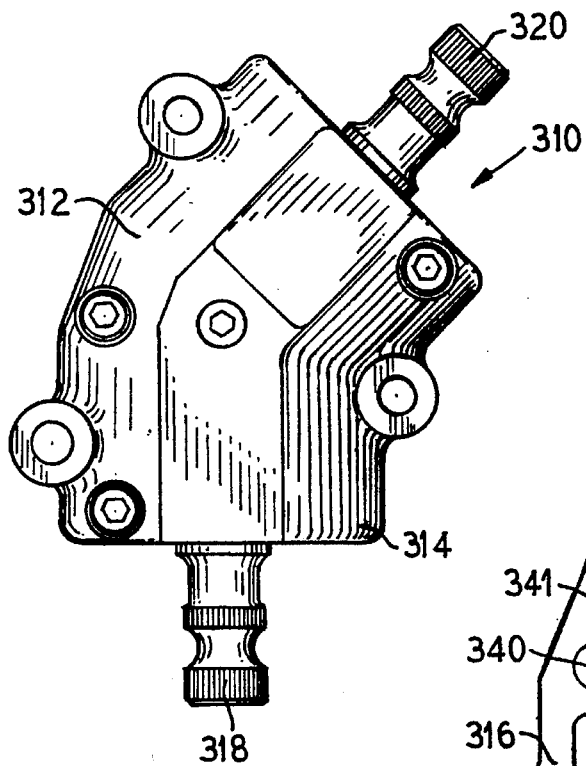
FIG. 5 is a top view of an alternative embodiment of the improved gearbox of the present invention.

Gearbox housing 12 also has a transverse plane of symmetry taken longitudinally along and through at least one of the input or output shafts 20,18. Gearbox housing 12 further includes input shaft openings 22 and output shaft openings 24 therein. Input shaft 20 is disposed within at least one of the input shaft openings 22 and output shaft 18 is disposed through at least one of the output shaft openings 24, although two input shafts 20,20 and two output shafts 18,18 may be utilized in some embodiments. Gearbox housing 12 further has a horizontal plane of mirror image symmetry, such that the top and bottom portions 14,16 are mutual mirror images. That feature of embodiments of the present invention is depicted in FIGS. 1, 3 and 5.

As indicated herein, input and output shafts 20,18 of the improved gearbox 10 of the present invention are each "straddle-mounted", which allows for a gearbox 10,110 that is lesser in depth, and thus smaller in all over size. As the term "straddle-mounted" is used by those of ordinary skill in the art, that term refers to a shaft wherein gear 26 is disposed between bearing 28,30 journaling such shaft 20, as shown in FIGS. 1, 2 and 3 hereof. These straddle-mounted designs are contrasted from the prior art "extended hub" design as shown in FIG. 4 thereof, wherein at least one of the shafts, for example input shaft 220, has gear 226 mounted distally of both of input shaft bearings 228,230. The result is that an "extended hub" 227 must be placed outside of the main gearbox housing 212, which creates a gearbox 210 having a larger overall size.

Figure 3:
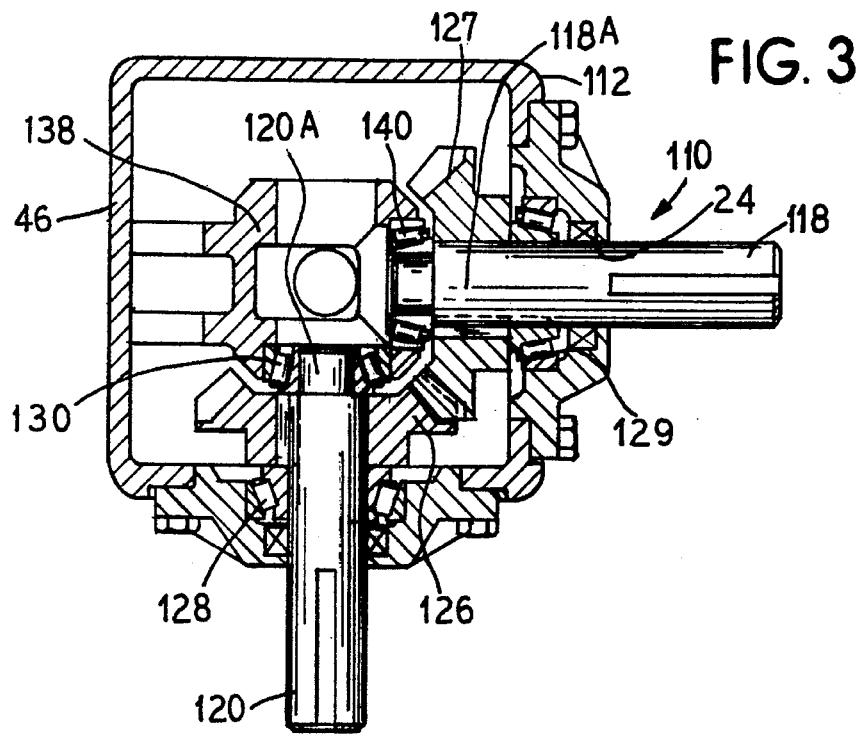
FIG. 3 is a cross sectional view of one preferred embodiment of the improved gearbox of the present invention showing the details of the internally-journaled input and output shafts on bearings held by a common bearing mount for both of the input and output shafts to provide a straddle-mounted design thereto.
Figure 4:
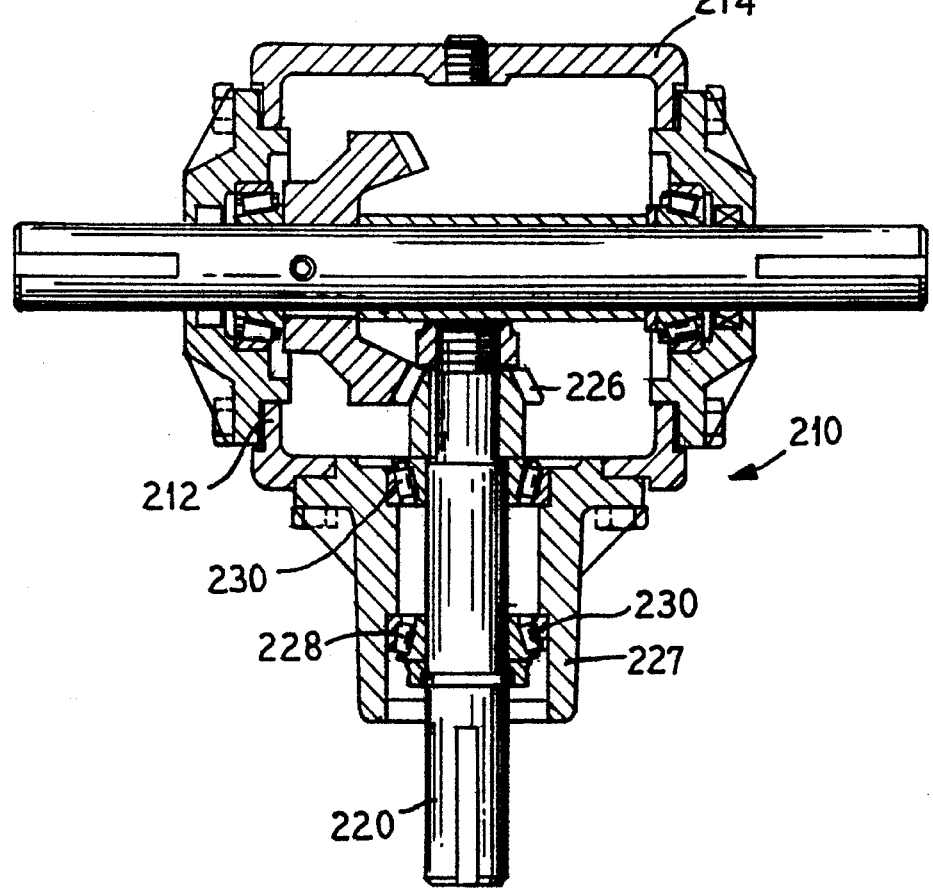
FIG. 4 is a cross sectional view of a prior art gearbbox having an extended hub gear mounting arrangement.

The applicant's straddle-mounted embodiments of FIGS. 1, 2 and 3 may be set forth in at least two different embodiments. In the embodiment of FIGS. 1 and 2, one of the shafts, input shaft 20 for example, is journaled centrally within gearbox housing 12, and the other shaft, output shaft 18, for example, extends across the entirety of housing 12 and is journaled on opposite sides 32,34 of housing 12. In such embodiment, at least one central bearing mount 36 is disposed within housing 12 at a location which is substantially proximate to the intersection of the rotational axes of input shaft 20 and output shaft 18. Central bearing mount 36 functions to hold bearings 30 thereon for journaling at least one of input shaft 20 and output shafts 18 (here, input shaft 20). In summary, in the embodiment of FIGS. 1 and 2, only one of shafts 20,18 is journaled at the central bearing mount 36 and the other shaft is journaled on opposite sides 32,34 of the housing.

In the alternative and likewise preferred embodiment as set forth in FIG. 3, both input shaft 120 and output shaft 118 are journaled at a common bearing mount 138. In this embodiment, common bearing mount 138 is disposed substantially centrally within housing 112. Such common bearing mount 138 is preferably disposed proximate to the intersection of the rotational axis of the input and output shafts 120,118. Common bearing mount 138 functions for holding bearings 130 thereon for journaling input shaft 120 and bearings 140 thereon for output shafts 118, upon which is mounted output gear 127, which is driven from input gear 126. Bearings 129 are held by housing 112.

In the embodiment of FIG. 3, input and output shafts 120,118 each has a distal end 120A,118A thereof which is rotationally journaled on the respective bearings 130,140 therefor and within housing 112. The bearings 130,140 held by the common bearing mount 138 preferably comprise plastics and/or composite bearings, one form of which is available from Igus Inc. of East Providence, R.I., and are sold under the trademark "Iglide Oil-Free Bearings". Although such plastic bearings are preferably utilized, other bearings known to those of ordinary skill in the art, such as metal bearings, may be utilized. Such bearings are disposed to journal the distal ends 120A,118A of the respective input and output shafts 120,118 and are disposed interiorly within housing 112.

Each of the input and output shafts 20,18 has a spline 42,44 thereon, and such splines 42,44 are preferably rolled as opposed to being cut, which eliminates retaining rings or pins that may result in weakness to the shaft.

In preferred embodiments of the improved gearbox 10 of the present invention, epoxy adhesive sealing 46 is preferably disposed between top and bottom portions 14,16 of housing 12 for joining and sealing the top and bottom portions 14,16 thereof together.

Although the improved gearbox 10 of the present invention is depicted in the Figs. hereof showing input shaft 20 and output shaft 18 disposed at an angle of 90° to each other, it should be understood that other angles of mutual disposition of such shafts (such as for example 135° and other angles, greater or lesser) are intended to be within the scope of the present invention.

Figure 7:
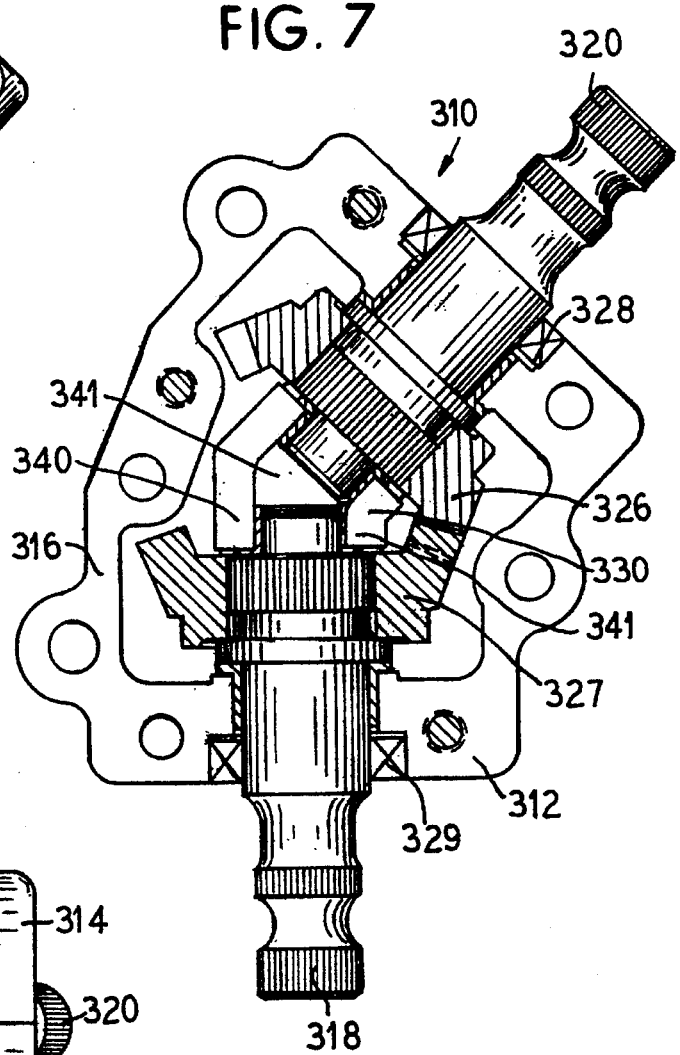
FIG. 7 is an equatorial cross-sectional view of the alternative embodiment of FIGS. 5-6.
Figure 6:
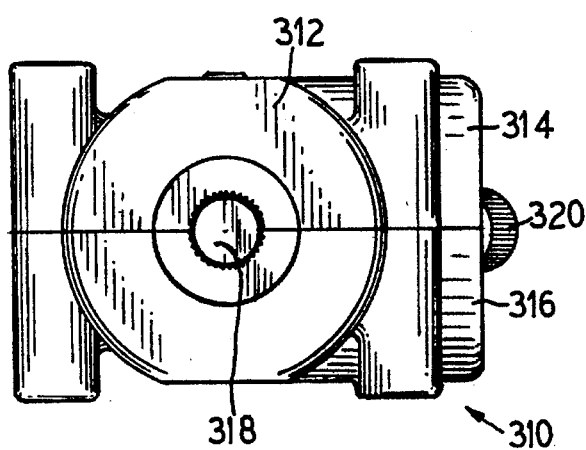
FIG. 6 is a view of one of the sides of the alternative embodiment of FIG. 5.

One such alternative embodiment is depicted in FIGS. 5–7 wherein numbers in the 300 series are utilized to correspond where appropriate to previously used referenced numerals as set forth in FIGS. 1–4. In particular, improved gearbox 310 of the present invention comprises a symmetrical split-half housing 312 having housing top 314 and bottom 316. Output shaft 318 and input shaft 320 extend from housing 312, as described supra in regard to the embodiments of FIGS. 1–3.

Referring now to FIG. 7, input and output shafts 318,320 are also "straddle-mounted" as described, supra, with regard to the embodiments set forth in FIGS. 1–2. In particular, input shaft 320 has gear 326 mounted distally of both input shaft bearings 328,330. Also, output gear 327 is mounted on output shaft 318 and is driven from input gear 326, again similarily to the embodiments of FIGS. 1–3 hereof. In such embodiments, bearings 330,340 may be held in a common bearing mount 341 to journal the respective internal ends of output shaft 318 and input shaft 320.

These features of the improved gearbox of the present invention have resulted in a gearbox which has a minimum of internal functional parts, which has great versatility, and is made available at moderate cost.

The basic and novel characteristics of the improved apparatus of the present invention will be readily understood from the foregoing disclosure by those skilled in the art. It will become readily apparent that various changes and modifications may be made in the form, construction and arrangement of the improved apparatus of the present invention, which various respective inventions are as set forth hereinabove without departing from the spirit and scope of such inventions. Accordingly, the preferred and alternative embodiments of the present invention set forth hereinabove are not intended to limit such spirit and scope in any way.

What is claimed is:

1. An improved gearbox comprising:
   an essentially symmetrical, split-half housing having top and bottom portions, said housing having at least one input shaft opening and at least one output shaft opening, said housing having a horizontal plane of symmetry such that said top and bottom portions are interchangeable and essentially identical, and said housing further having a traverse plane of essential symmetry taken longitudinally along and through at least one of said input and output shafts, whereby a single form of housing may serve as both a top portion and a bottom portion;

at least one input shaft and at least one output shaft having respectively an input gear and an output gear, said shafts having respective journaled distal ends, and disposed through respective shaft openings therefor on said housing; said at lest one input shaft and said at least one output shaft having respective rotational axes;

bearings disposed within said housing for rotationally journaling said input and output shafts;

at least one central bearing mount means, disposed within said housing and substantially proximate to the intersection of said respective rotational axes of said at least one input shaft and at least one output shaft for holding bearings thereon for journaling at least one of said at least one input shaft and at least one output shaft;

at least one of said input and output shafts journaled at the journaled end thereof at said central bearing mount means.

2. The improved gearbox of claim 1 wherein each of said input and output shafts is journaled by bearings located on opposite sides of said respective gear thereof.

3. The improved gearbox of claim 1 wherein said bearings comprise self-lubricating plastic bearings.

4. The improved gearbox of claim 1 wherein said input and said output shafts each has a spline at the proximal end thereof and said splines comprise rolled splines.

5. The improved gearbox of claim 1 further comprising epoxy adhesive sealant disposed between said top and bottom portions of said housing for joining and sealing said top and bottom portions together.

6. The improved gearbox of claim 1 wherein said housing comprises die-cast aluminum.

7. An improved gearbox comprising:

an essentially symmetrical, split-half housing having top and bottom portions, said housing having at least one input shaft opening and at least one output shaft opening, said housing having a horizontal plane of essentially symmetry such that said top and bottom portions are interchangeable and essentially identical, whereby a single form of housing may serve as both a top portion and a bottom portion;

at least one input shaft and at least one output shaft each having an axis of rotation disposed through respective openings therefor on said housing;

common bearing mount means, disposed within said housing and substantially proximate to the intersection of said axis of rotation of input shaft and said output shaft, for holding bearings thereon for journaling at least one input shaft and at least one output shaft;

each of said input and output shafts having a free end and a journaled end, said each respective input and output shaft journaled end disposed within said housing at and by said bearing supported by said common bearing mount; and bearings for rotationally journaling said respective end of each of said input and said output shafts, said bearings disposed within the interior of said housing.

8. An improved gearbox comprising:

a split half housing having top and bottom portions, said housing having at least one input shaft opening and at least one output shaft opening, said housing having essentially a horizontal plane of mirror image symmetry such that said top and bottom portions are mutual mirror images;

at least one input shaft and at least one output shaft having respectively an input gear and an output gear, said shafts having respective journaled distal ends, and disposed through respective shaft openings therefor on said housing; said at least one input shaft and said at least one output shaft having respective rotational axes;

bearings disposed within said housing for rotationally journaling said input and output shafts;

at least one central bearing mount means, disposed within said housing and substantially proximate to the intersection of said respective rotational axes of said at least one input shaft and at least one output shaft for holding bearings thereon for journaling at least one of said at least one input shaft and at least one output shaft.

* * * * *